United States Patent
Zwiener et al.

(10) Patent No.: US 11,640,179 B2
(45) Date of Patent: May 2, 2023

(54) FLIGHT CONTROL UNIT AND METHOD FOR FLIGHT STABILIZATION OF A PERSON-CARRYING OR LOAD-CARRYING MULTICOPTER

(71) Applicant: Volocopter GmbH, Bruchsal (DE)

(72) Inventors: Jan Zwiener, Waldbronn (DE); Thomas Ruf, Sasbach (DE); Walter Fichter, Constance (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 434 days.

(21) Appl. No.: 16/722,535

(22) Filed: Dec. 20, 2019

(65) Prior Publication Data

US 2020/0241567 A1 Jul. 30, 2020

(30) Foreign Application Priority Data

Jan. 25, 2019 (DE) .......................... 102019101903.6

(51) Int. Cl.
  *G05D 1/10* (2006.01)
  *B64C 27/08* (2023.01)
  (Continued)

(52) U.S. Cl.
  CPC .............. *G05D 1/101* (2013.01); *B60L 15/20* (2013.01); *B64C 27/08* (2013.01); *B64D 27/24* (2013.01);
  (Continued)

(58) Field of Classification Search
  CPC ..... G05D 1/101; B60L 15/20; B60L 2200/10; B64C 27/08; B64D 27/24; B64D 31/04; B64D 31/14
  See application file for complete search history.

(56) References Cited

U.S. PATENT DOCUMENTS 9,663,237 B2 5/2017 Senkel et al.
2019/0291863 A1* 9/2019 Lyasoff .................. G05D 1/102
(Continued)

FOREIGN PATENT DOCUMENTS

DE  102012202698  8/2013
EP  3176084       6/2017
WO  2017095610    6/2017

OTHER PUBLICATIONS

English translation of Achtelik (EP 3176084) (Year: 2017).*

*Primary Examiner* — James M McPherson
*Assistant Examiner* — Kyle J Kingsland
(74) *Attorney, Agent, or Firm* — Volpe Koenig

(57) ABSTRACT

A method is provided for stabilizing an orientation and height of a person or load-carrying multicopter with a plurality of motors, wherein the drive of the individual motors in flight is continuously calculated by a flight control unit and correspondingly prescribed to the motors using control technology, for which purpose, based on a desired torque $\tau$, of a desired thrust s preferably prescribed by a pilot signal, and of a motor matrix M, the drive of the motors is calculated by a motor allocation algorithm f and provided as a control signal to the motors, wherein the following applies to the drive and the corresponding motor control variables u: $u=f(\tau, s, M)$. The method provides that A) the individual motors are weighted with a preferably diagonally filled matrix P, so that the following applies: $u=f(\tau, s, M, P)$, the motor allocation algorithm calculates the drive u such that the individual motors make an individual contribution to the desired forces and torques T and to the thrust s in accordance with the matrix P depending on the weighting; and/or B) zero space orientations with $0=M \cdot u_N$ that do not generate any torques or thrust, and therefore do not influence the flight movement, are used to drive the motors.

16 Claims, 5 Drawing Sheets

(51) Int. Cl.
*B64D 27/24* (2006.01)
*B64D 31/14* (2006.01)
*B60L 15/20* (2006.01)
*B64D 31/04* (2006.01)

(52) U.S. Cl.
CPC ............ *B64D 31/04* (2013.01); *B64D 31/14* (2013.01); *B60L 2200/10* (2013.01)

(56) References Cited

U.S. PATENT DOCUMENTS

2019/0329898 A1* 10/2019 Jenkins ................... B64C 39/04
2020/0103922 A1* 4/2020 Nonami ............... G05D 1/0072

\* cited by examiner

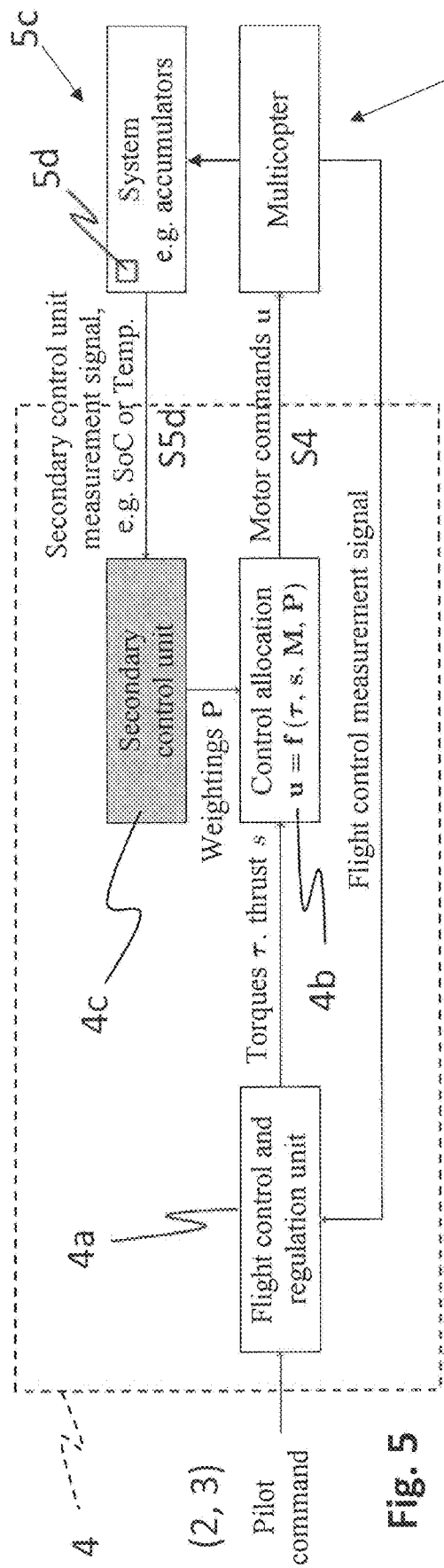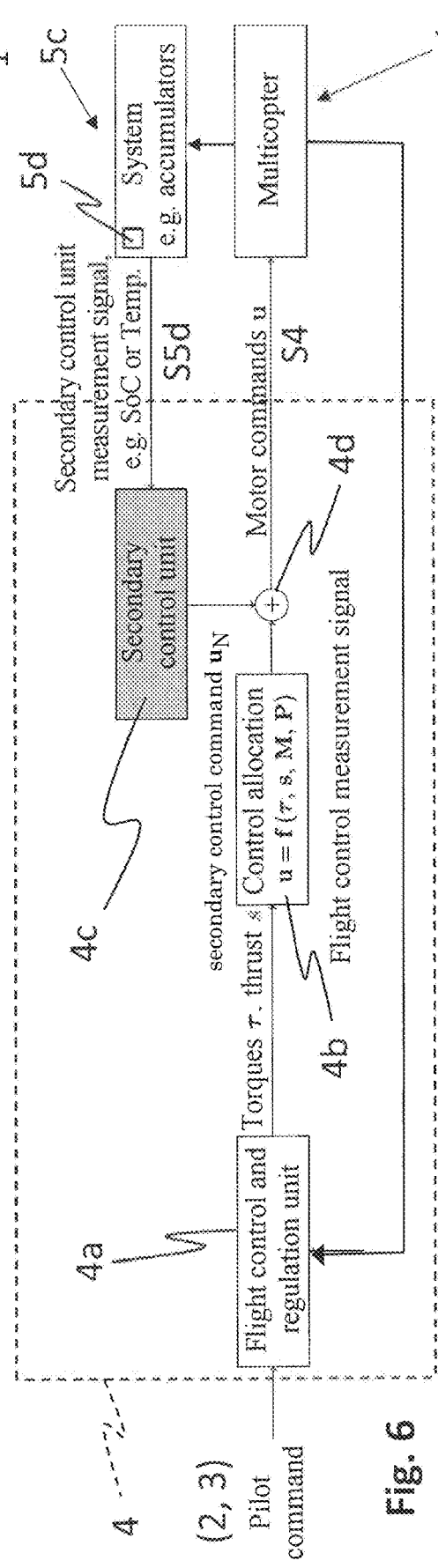

FLIGHT CONTROL UNIT AND METHOD FOR FLIGHT STABILIZATION OF A PERSON-CARRYING OR LOAD-CARRYING MULTICOPTER

INCORPORATION BY REFERENCE

The following documents are incorporated herein by reference as if fully set forth: German Patent Application No. DE 10 2019 101 903.6, filed Jan. 25, 2019.

TECHNICAL FIELD

The invention relates to a method for stabilizing the orientation and the height of a preferably person-carrying or load-carrying multicopter with a plurality of motors, wherein the drive of the individual motors in flight is continuously calculated by a flight control unit and correspondingly prescribed to the motors using control technology. The drive of the motors is calculated for this purpose by a motor allocation algorithm on the basis of a desired torque, of a desired thrust preferably prescribed by a pilot signal, and of a motor matrix, and a corresponding control signal is provided to the motors.

The invention further relates to a flight control unit for a preferably person-carrying or load-carrying multicopter with a plurality of motors, wherein said flight control unit is designed to calculate continuously the drive of the individual motors in flight and correspondingly prescribe said drive to the motors using control technology. A motor allocation algorithm is implemented in the flight control unit, through which, on the basis of a desired torque, of a desired thrust preferably prescribed by a pilot signal, and of a motor matrix, the drive of the motors can be calculated and a corresponding control signal can be provided to the motors.

The invention finally also relates to a preferably person-carrying or load-carrying multicopter with a plurality of motors, and with a flight control unit for the drive of the motors.

To stabilize the orientation and the height of a preferably person-carrying or load-carrying multicopter with a plurality of rotors and an associated plurality of (electric) motors, the drive of the individual motors must be continuously calculated during flight. This usually takes place by an allocation algorithm which calculates the drive of the motors on the basis of prescribed forces and torques (known as a motor allocation algorithm).

The motor allocation algorithm f calculates the motor control variables u for the motor drive from the desired torques T, a desired thrust s and the motor matrix M in the form:

$$u = f(\tau, s, M).$$

The motor matrix M is (in this case) an m×n matrix (n indicates the number of motors or rotors present, for example 18; m represents the number of lines in the matrix, and is usually four (4)). If this matrix is multiplied by a motor speed vector n×1 or 18×1, an m×1 (4×1) vector results which contains the generated torques (roll, pitch and yaw in the coordinate system referenced to the body of the multicopter, in the unit of newton-meters) as well as the total thrust in newtons. The matrix M depends on the placement of the motor/propeller combination (with reference to the center of gravity of the aircraft), as well as the power density. For a multicopter with 8 motors, the matrix M could, for example, take the following form:

$$\begin{pmatrix} 0.59 & 1.41 & 1.41 & 0.59 & -0.59 & -1.41 & -1.41 & -0.59 \\ 1.44 & 0.56 & -0.56 & -1.44 & -1.44 & -0.56 & 0.56 & 1.44 \\ -1.00 & 1.00 & 1.00 & -1.00 & -1.00 & 1.00 & 1.00 & -1.00 \\ 1.00 & 1.00 & 1.00 & 1.00 & 1.00 & 1.00 & 1.00 & 1.00 \end{pmatrix}$$

In the case of a person-carrying or load-carrying multicopter, such as the Volocopter® from the company of the applicant/proprietor, the individual motors (in particular 18) are powered by different electrical energy stores in the form of accumulators or batteries (in particular nine), wherein each battery is assigned to two motors. If individual batteries, for example, heat up more strongly, or discharge more quickly as a result of unfavorable load distributions in the aircraft, the flight disadvantageously has to be ended prematurely, for which purpose a landing must be initiated.

SUMMARY

The invention is based on the object of providing a method of the type mentioned at the beginning which, when applied, allows the above-mentioned disadvantages to be avoided. In particular, through a novel drive of the motors, said motors are to be relieved in order in this way to extend the flight time or to increase what is known as the safety margin. In the case of electrically driven multicopters in particular, the length of the flight time represents a crucial marketing criterion, so that in this way a significant additional value can be provided to the multicopter.

In addition to this, other problems can also be avoided or reduced through the skillful drive of the motors, in particular the overheating of individual motors, excessive noise generation from individual motors, and an excessive local deformation of a mechanical structure of the multicopter as can, for example, occur as a result of unfavorable load distributions or wind conditions.

The invention is moreover based on the object of providing a flight control unit for a preferably person-carrying or load-carrying multicopter with a plurality of motors with which such an improved drive method can be implemented in practice.

Finally, an improved, preferably person-carrying or load-carrying multicopter with a plurality of motors should also be made available in this way.

These objects are achieved by a method with one or more features of the invention, a flight control unit with one or more features of the invention, and a multicopter with one or more features of the invention.

Advantageous developments of the respective idea according to the invention are defined below and in the claims.

A method according to the invention for stabilizing the orientation and the height of a preferably person-carrying or load-carrying multicopter with a plurality of motors, wherein the drive of the individual motors in flight is continuously calculated by a flight control unit and correspondingly prescribed to the motors using control technology, for which purpose, on the basis of a desired torque $\tau$ (a vector with dimension 3), of a desired thrust s (a scalar) preferably prescribed by a pilot signal, and of a motor matrix M, the drive of the motors is calculated by a motor allocation algorithm f and provided as a control signal to the motors, wherein the following applies to the drive and the corresponding motor control variables u:

$$u = f(\tau, s, M),$$

wherein
A) the individual motors are weighted with a preferably diagonally filled matrix P, so that the following applies:

$$u=f((\tau,s,M,P),$$

wherein the motor allocation algorithm calculates the drive u in such a way that the individual motors make an individual contribution to the desired torques T and to the thrust s in accordance with the matrix P depending on the weighting;

and/or

B) primary motor control variables in the form of the drive u are modified, preferably supplemented, by secondary motor control variables $u_N$ that satisfy the condition $$0 = M \cdot u_N$$

(known as zero space orientations). Through the selection of $u_N$ the individual contribution of each individual motor can thus be adjusted without the desired torques T or the thrust s as a whole being changed.

Both methods (variant A) and B)) have the property that through a secondary control (P or $u_N$), although the drive of the motors is influenced, no additional torques or thrust are thereby generated. The secondary control therefore does not have any effect on the flight movement, which advantageously enables a decoupled treatment of flight control and secondary control (including in terms of certification).

In variant A), the elements at the position i of the diagonal matrix P(i, i) can be directly, linearly be brought into relation with the motor temperature. For example, P(i, i)=1.0 for a motor that is in its target temperature range.

In variant B) it is ensured through the choice of the zero space orientations $u_N$ that the secondary control does not generate any additional torques or thrust.

Let γ be the desired secondary control variable (e.g. a current flow in the batteries assigned to the motors, or a bending torque that excites vibrations of a structure of the multicopter). This relationship applies:

$$\gamma = h(u+u_N).$$

The following relationship can be used for the calculation of the secondary control command $u_N$:

$$\begin{pmatrix} 0 \\ \gamma + h(u) \end{pmatrix} = \begin{bmatrix} M \\ \partial h / \partial u \end{bmatrix} \cdot u_N$$

wherein ∂h/∂u represents the partial derivative of h with respect to u. This problem can be solved as a secondary allocation problem with the usual allocation algorithms for $u_N$.

A flight control unit according to the invention for a preferably person-carrying or load-carrying multicopter with a plurality of motors, wherein said flight control unit is designed to calculate continuously the drive of the individual motors in flight and correspondingly prescribe said drive to the motors using control technology, wherein the drive of the motors can be calculated by a motor allocation algorithm f implemented in the flight control unit on the basis of a desired torque τ, of a desired thrust s preferably prescribed by a pilot signal and of a motor matrix M and can be made available as a control signal to the motors, wherein the following applies for the motor control variables u:

$$u = f(\tau,s,M),$$

wherein a secondary control unit in operative connection on the one hand with the motor allocation algorithm and on the other hand with at least one sensor for the determination of an influencing variable, wherein
A) the secondary controller is designed to make weightings of the individual motors available to the motor allocation algorithm in the form of a preferably diagonally filled matrix P depending on at least one influencing variable determined by the sensor, wherein the following applies:

$$u=f(\tau,s,M,P),$$

wherein the motor allocation algorithm is designed to calculate the drive u in such a way that the individual motors make an individual contribution to the desired forces and torques τ and to the thrust s in accordance with the matrix P depending on the weighting;

and/or

B) the secondary controller is designed, depending on at least one influencing variable determined by the sensor, to provide signals for drive of the motors corresponding to zero space orientations $u_N$ with $$0 = M \cdot u_N$$

which do not generate any torques or thrust and which therefore do not influence the flight movement, and to modify the drive through these zero space orientations or the corresponding signals (secondary motor control variables);

preferably according to the method as described herein.

A preferably person-carrying or load-carrying multicopter according to the invention with a plurality of motors, preferably 18, and with a flight control unit for the drive of the motors wherein the flight control unit is designed as a flight control unit according to the invention.

According to one variant of the method according to the invention, the individual motors are thus individually weighted in accordance with a preferably diagonally filled matrix P (with corresponding weights or weighting factors). In the neutral case—with all the motors weighted equally—the matrix P would correspond to an 18×18 identity matrix:

$$u=f(\tau,s,M,P).$$

In general, $$P = \begin{bmatrix} g_1 & 0 & 0 & 0 \\ 0 & g_2 & 0 & 0 \\ 0 & 0 & \ddots & 0 \\ 0 & 0 & 0 & g_i \end{bmatrix},$$

i=1 . . . n, applies to the matrix, wherein n represents the number of motors (preferably, but without restriction, 18) and $g_i$ represents the individual weights or weighting factors.

Fundamentally, the flight control unit calculates the motor commands u on the basis of the model $$\begin{pmatrix} \tau \\ s \end{pmatrix} = M \cdot u.$$

For the case in which the aircraft has more than four rotors, the system is thereby not fully utilized, and/or allows for various possible solutions (drive or motor commands u) to achieve an intended flight state.

The algorithm calculates the drive u in such a way that the corresponding motors (depending on the weighting) contribute more or less to the desired torques and forces ($\tau$, which represents a torque in the unit of Nm, and s, which represents the thrust in the unit of newtons). The advantage of the weighting is that the mathematical space in u is not simply restricted, as would be entailed by completely switching off one of the motors. If the flying status requires it (e.g. in the event of a complete motor failure), the "weakened" motors (in particular those with $g_i<1$) are automatically also used to correct the flight status.

The method described above corresponds to variant A) in accordance with patent claim 1. Additionally or as an alternative, the method according to a variant B) can be carried out, wherein what are known as zero space orientations $u_N$ are used to drive the motors, for which the following applies:

$$0 = M \cdot u_N$$

These zero space orientations are those vectors which, according to the equation given above, do not generate any torques or thrust, and therefore do not influence the flight movement.

A first development of the method according to the invention provides that, for case A), the drive u is determined on the basis of a model $$\begin{pmatrix} \tau \\ s \end{pmatrix} = M \cdot u$$

wherein the weighting factors P are defined by a target function $u^T \cdot P \cdot u$ for the allocation, wherein preferably the target function is minimized under the auxiliary condition $(\tau\ s)^T = M \cdot u$.

In this way the weighting factors can be determined in a simple manner.

In the course of another development of the method according to the invention, it is provided for case A) that in the neutral case the matrix P corresponds to an n×n identity matrix, where n represents the number of motors. In this case all the motors are driven with the same weighting as is known from the prior art. This may correspond to a desired ideal case which in practice, however, possibly does not occur.

Yet another development of the method according to the invention provides that, in case A), those motors whose assigned electric energy stores (batteries) heat up more strongly and/or discharge more quickly, for example as a result of unfavorable load distributions in the multicopter, are given a lower weighting using the matrix P than other motors. In this way, those motors whose associated electric energy stores heat up more strongly and/or discharge more quickly are given a lower weighting in ongoing flight operation, and are accordingly only employed to a reduced extent to achieve a desired flight behavior. The heating or discharge of the energy store can be countered in this way.

Accordingly, in another development of the method according to the invention, it can be provided that for case A) those motors that bring about an excessive deformation of a structure of the multicopter and/or that lead to an excessive generation of noise are given a lower weighting than other motors by using the matrix P. As already described above, motors of this sort are employed to a lesser degree to achieve a desired flight behavior, so that the said deformation or noise generation can be countered.

In the practical implementation of the method according to the invention and its developments, suitable sensors are preferably employed, with which, for example, the heating of the energy stores, the discharge of the energy stores, the deformation of the multicopter structure and the excessive noise generation referred to can be determined (i.e. measured). The said sensors can accordingly be thermometers, microphones, strain gauges, voltage meters or the like, to name just a few possibilities.

With appropriate development, it is possible with the aid of the method according to the invention to ensure that for case A) at least some of the motors are relieved through the drive of the motors by use of the matrix P, and the flight time thereby extended with respect to operation with unweighted drive, or a safety reserve increased. According to the prior art, it would, for example, be necessary to initiate an (emergency) landing of the multicopter if one energy store is excessively discharged. Through the potential targeted relief in accordance with the invention of some motors at which the said problems occur, this problem can be avoided or at least delayed, so that the flight time can be lengthened or the safety reserve increased.

An exceptionally preferred development of the method according to the invention provides that at least one of the following influencing values is used as the influencing value for the calculation of the weighting factors for the matrix P or the zero space orientations:

a measured temperature of at least one of the electric energy stores assigned to the motors;
a measured temperature of at least one of the motors;
a measured temperature of at least one of the electrical or mechanical accessory parts assigned to the motors;
a measured (or estimated) deformation of a structure of the multicopter;
a measured (or estimated) noise emission.

The sensors already referred to further above can be applied for measurement of the said influencing values.

Yet another development of the method according to the invention provides that for case A) at least one of the weighting factors is reduced if the influencing value used exceeds a predetermined threshold value. The weighting factor $g_i$ for one of the motors is, for example, reduced (to values <1) if the temperature of the associated electric energy store exceeds a predetermined temperature threshold value, in order to protect the motor concerned or its energy store.

In the course of another development of the method according to the invention it can be provided in this context that for case A), a reduction of the weighting of a motor brings about a reduction of a corresponding motor speed. The reduction of the motor speed contributes to protecting the motor and, correspondingly, also to protecting the associated electric energy store. If an excessive deformation is measured at one point in the structure of the multicopter, this can also be countered through a corresponding reduction in the motor speed. The motor speed also as a rule correlates directly to a noise emission caused by the corresponding motor or rotor, so that it is again possible to have a targeted influence.

The flight control unit according to the invention is—as already described further above—designed to implement the method according to the invention in practice. For this purpose it comprises what is known as a secondary control unit that is accordingly designed and configured for implementation and realization of cases A) and B) using control technology. To this end, the secondary controller cooperates with the at least one sensor that is designed for the determination of a (physically measurable) influencing value. Influencing values that could be employed in the context of the present invention were already referred to above.

A first development of the flight control unit according to the invention provides—depending on the application—that
a) for a balanced loading of electric energy stores, at least one sensor for the determination of an operating state, preferably voltage, of an energy store is provided, through which a corresponding control signal is or can be provided to the secondary controller; and/or
b) to prevent overheating of electric energy stores, at least one sensor for the determination of an operating state, preferably temperature, of an energy store is provided, through which a corresponding control signal is or can be provided to the secondary controller; and/or
c) to attenuate the aeroelasticity, at least one sensor for the determination of an operating state, preferably deformation, of a structure of the multicopter is provided, through which a corresponding control signal is or can be provided to the secondary controller; and/or
d) for the avoidance of noise, at least one sensor for the determination of an operating state, preferably noise emission, of a motor or propeller is provided, through which a corresponding signal is or can be provided to the secondary controller.

The respective sensors thus provide a corresponding control signal and secondary controller, so that the flight control unit according to case A) or according to case B) can manipulate the motor control in a targeted manner in order to introduce or implement the assistance measures using control technology named at a) to d).

A closed control loop is formed through the feedback of the control signals provided by the respective sensors. Here P (case A) or $u_N$ (case B) represent the corresponding (secondary) control variables of the respective secondary controller.

In this connection, it is provided according to another, altogether advantageous development of the flight control unit according to the invention, that, in accordance with the control signal by way of the secondary controller, the drive of the motors can be influenced in such a way that the operating state approaches a predefined operating state. The predefined operating state can, in particular, be a desired or normal operating state of the multicopter that is striven for in problem-free or fault-free flight operation.

In the course of another development of the flight control unit according to the invention, it is provided that this flight control unit is designed to determine the drive u based on a model $$\begin{pmatrix} \tau \\ s \end{pmatrix} = M \cdot u$$

wherein the weights or weighting factors of P are defined by a target function $u^T \cdot P \cdot u$ for the allocation, for which the target function is minimized under the auxiliary condition $(\tau\ s)^T = M \cdot u$. This has already been considered in more detail further above in the context of the method.

In order to be able to counter, through control technology, certain problems that can occur in the flight operation of the multicopter, and which were already considered in detail further above, another further development of the flight control unit according to the invention provides that for case A) by use of the matrix P those motors whose associated electric energy store heats up more strongly and/or discharges more quickly as a result of unfavorable load distributions in the multicopter are or can be given lower weighting than other motors, and/or which for case A) by use of the matrix P those motors that bring about an excessive deformation of a structure of the multicopter and/or which lead to an excessive generation of noise are or can be given lower weighting than other motors.

The flight control unit according to the invention can advantageously be used in a preferably person-carrying or load-carrying multicopter with a plurality of motors (in particular six or more), preferably and without restriction 18 motors, to drive the motors, which has already been considered further above.

BRIEF DESCRIPTION OF THE DRAWINGS

Further properties and advantages of the invention emerge from the following description of exemplary embodiments with reference to the figures.

FIG. 5 shows a schematic illustration of a flight control unit according to case A); and FIG. 6 shows schematically a design of the flight control unit for the realization of case B).

DETAILED DESCRIPTION

Figure 1:
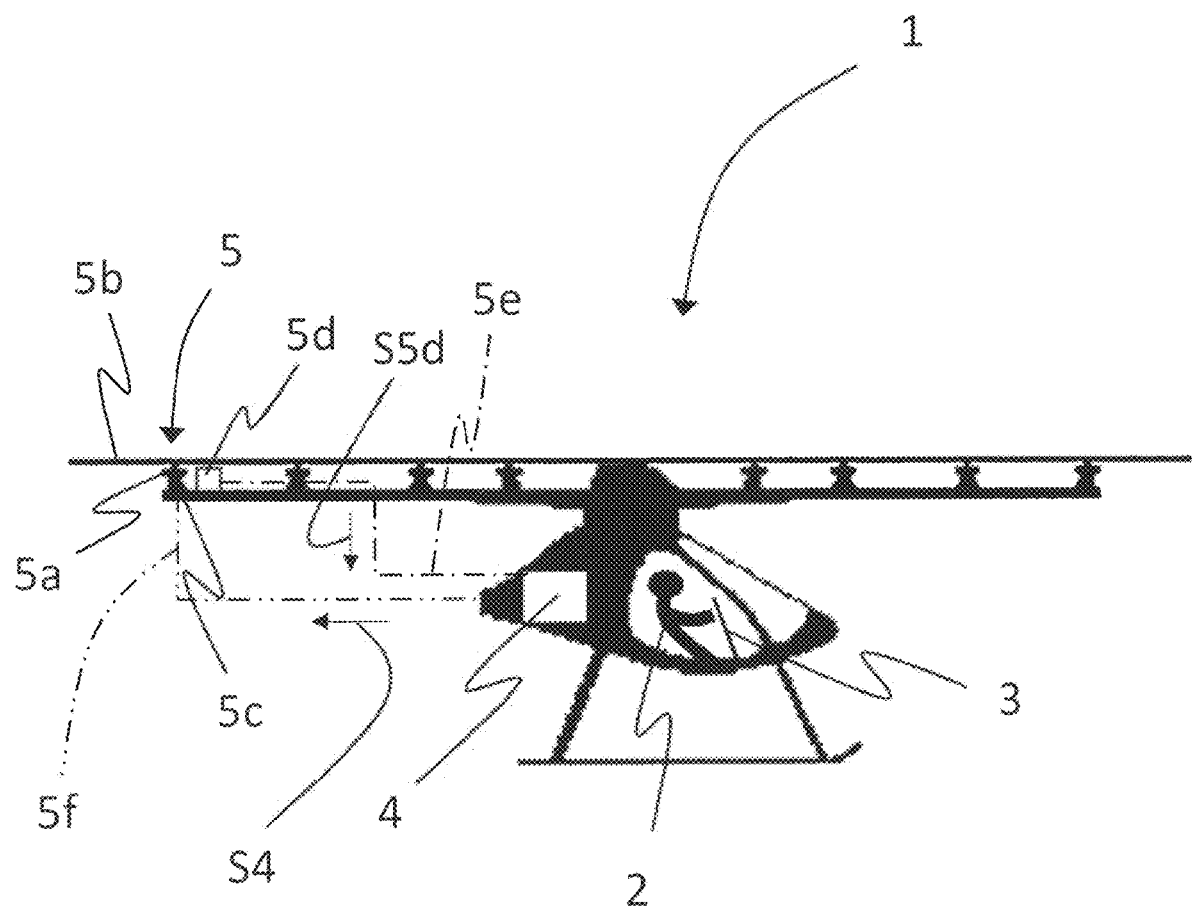
FIG. 1 shows schematically a person-carrying or load-carrying multicopter with a plurality of motors that is designed in accordance with the present invention.

A person-carrying or load-carrying multicopter is illustrated schematically in FIG. 1, identified as a whole with reference sign 1. Reference sign 2 identifies the pilot or, in general, a person carried by the multicopter 1, who stipulates by use of a control element 3 a desired flight movement or a flight state of the multicopter 1 in accordance with a corresponding pilot signal. This pilot signal is taken to a flight control unit 4 contained in the multicopter 1, said flight control unit not being further illustrated in FIG. 1.

The multicopter 1 has a plurality of drive units 5, of which, for reasons of clarity, only one is drawn more precisely in FIG. 1. Each of the drive units 5 comprises an (electric) motor 5a, which drives an associated propeller or rotor 5b. An electric energy store 5c in the form of a battery is assigned to the motor 5a in order to supply the motor 5a with electric energy. It is not necessary here for each motor 5a to have its own assigned energy store 5c; it is within the scope of the invention that pluralities of rotors 5a share a common electric energy store 5c. According to one advantageous embodiment of the multicopter 1 with, in particular, 18 motors 5a and accordingly 18 rotors 5b, a common electric energy store 5c is assigned to each two motors 5a, so that the multicopter 1 has in total nine electric energy stores 5c.

A sensor that is assigned to the drive unit 5 is indicated schematically in FIG. 1 by reference sign 5d. As described in the introductory part, the sensor 5d can, for example, be a temperature sensor, a charge level sensor, a noise sensor or a sensor for the measurement of mechanical deformations. Depending on the design of the sensor 5d it is accordingly possible to measure, for example, a temperature of the motor 5a, a temperature or a charge level of the electric energy store 5c, a noise emission caused by the motor 5a or the rotor 5b, or a mechanical deformation of the structure of the multicopter 1 at the location of the drive unit 5, said structure not being specified in FIG. 1, but which in principle can comprise all the mechanical elements of the multicopter 1, in particular the rotor arms extending from a central structure of the multicopter 1. The noise emission and/or the mechanical deformation of the structure of the multicopter 1 can, alternatively, also be estimated if a measurement is not directly possible.

The sensor 5d works together with the flight control unit 4 through signal technology. This is symbolized in FIG. 1 by a dash-dot connecting line 5e, wherein the connection can be realized wirelessly or by use of appropriate cabling. The sensor 5d sends a corresponding sensor signal S5d along this connection to the flight control unit 4, as is illustrated symbolically in FIG. 1. The flight control unit 4 is, for its part, connected to the drive units 5, in particular to the motors 5a, in order to drive these in a suitable manner during flight operation. The corresponding connection is indicated in FIG. 1 with reference sign 5f, and the corresponding drive signals with the reference sign S4. In particular, using the control signals S4 by use of the flight control unit 4, the individual motors 5a of the multicopter 1 can be manipulated using technology in such a way that they are operated individually with a rotation speed suitable for achieving a desired flight status, in order accordingly to generate a suitable thrust by use of the rotors 5a. The desired flight state results, as already explained, preferably with reference to a pilot signal (not illustrated) generated by the pilot 2.

Figure 2:
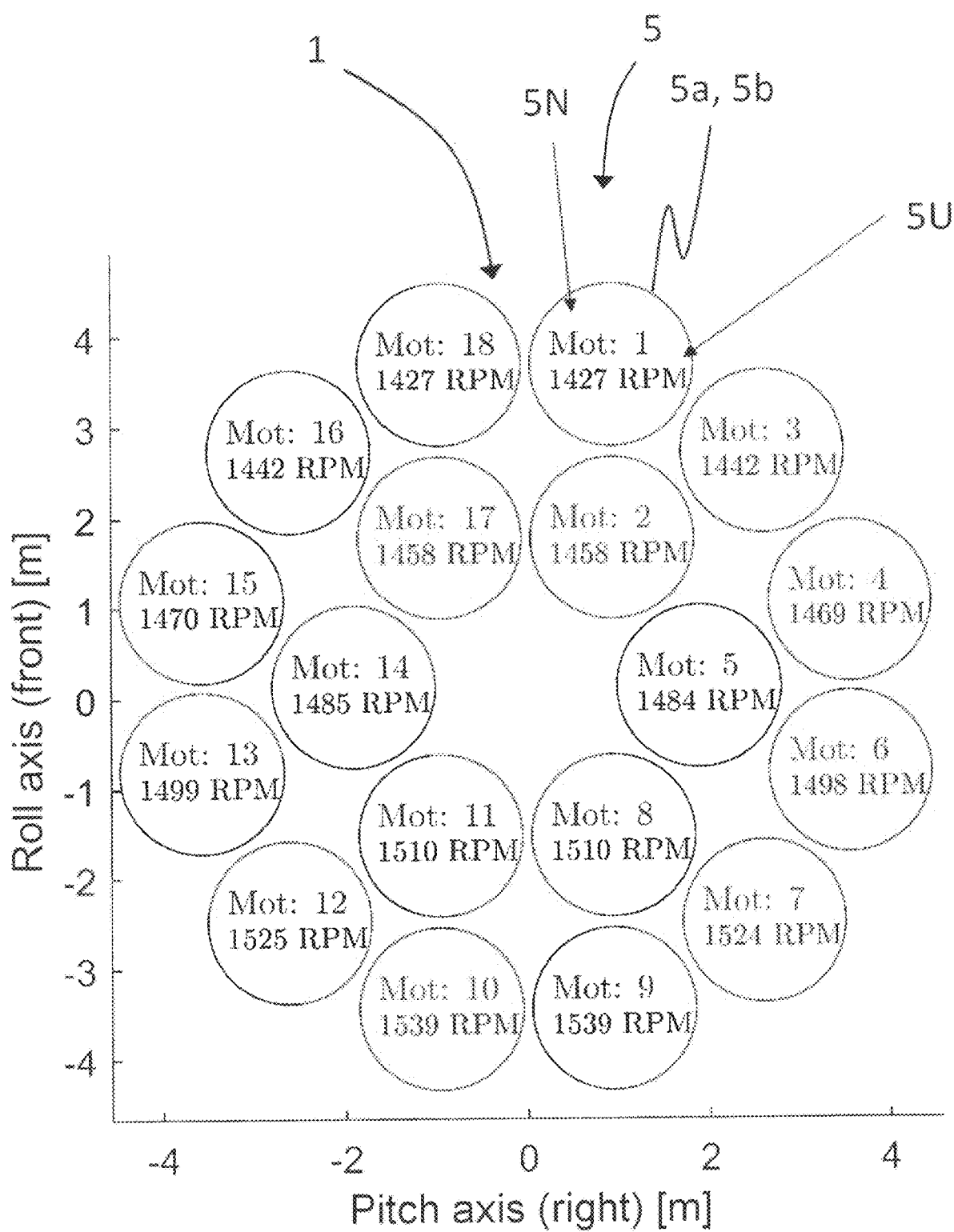
FIG. 2 shows a typical motor loading in the stationary flight state according to the prior art, in other words without individual weighting of the motors.

A specific flight state of the multicopter 1 is illustrated in FIG. 2 with reference to the rotation speeds of the individual motors 5a in the stationary state according to the prior art, according to which no individual weighting of the motors is implemented. FIG. 2 (as also in the following FIGS. 3 and 4) indicates a schematic plan view of the rotor plane of the multicopter 1, wherein the x-axis represents the pitch axis of the multicopter and the y-axis the roll axis of the multicopter. The motor 5a, or the associated rotor 5b, is symbolized in FIG. 2 (as also in the following FIGS. 3 and 4) by a circle. A number or identifier for the respective motor 5a is given in each circle at reference sign 5N, e.g. "Mot: 1". Additionally, at reference sign 5U, the corresponding motor speed is given in each circle in the unit of "RPM" (rotations per minute). According to the illustration in FIG. 2, all the motors have the same weighting, which is to say that they are all used to the same degree to achieve the desired flight state.

Figure 3:
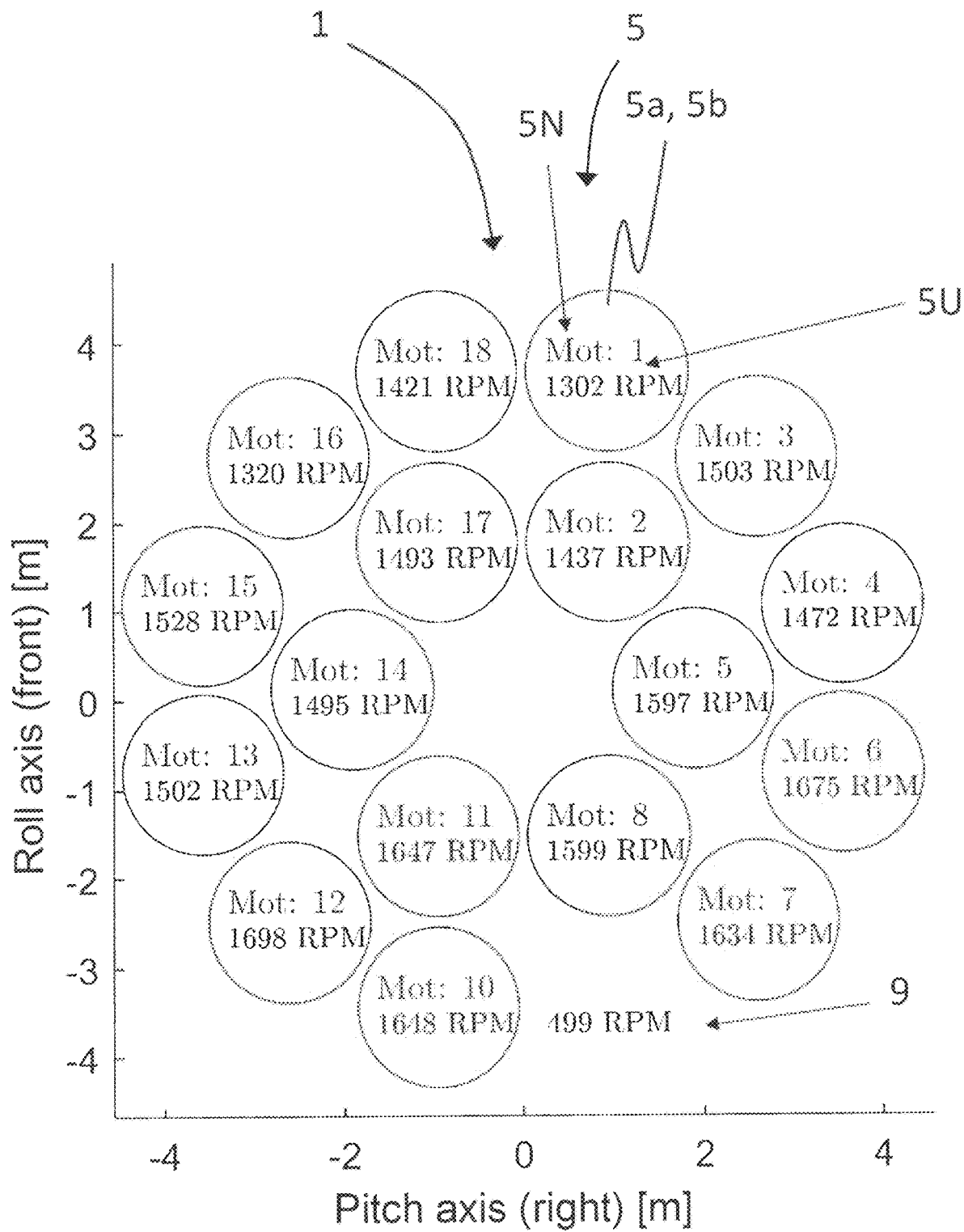
FIG. 3 shows a corresponding motor loading or drive with minimum weighting for one motor.

FIG. 3 symbolizes a realization of the method according to the invention wherein the motor with the identifier "Mot: 9" (lower right, reference sign 9) has its weighting strongly reduced, wherein the associated weighting factor $g_9$ has the value 0.01 in the particular case shown. As the comparison with FIG. 2 shows, the rotation speed of the motor 9 according to FIG. 3 is only 499 RPM, whereas according to FIG. 2 it was still at 1539 RPM. As a comparison of FIGS. 2 and 3 further shows, the rotation speeds of the other motors 5a have also changed, in order to compensate for the reduced contribution of motor 9. The motor 9 can in this way be protected, which can have various reasons that have already been referred to and considered further above. For example, it can have been established by the sensor 5d according to FIG. 1, which is assigned to the motor 9 concerned, that the motor concerned is causing a particularly high noise emission, which should be countered by reducing the rotation speed of the motor. The same is possible for the case in which the motor concerned is strongly heated, or that the associated electric energy store has a relatively low charge state. In this connection, other influencing factors may also be used, which also have already been considered in detail further above.

Figure 4:
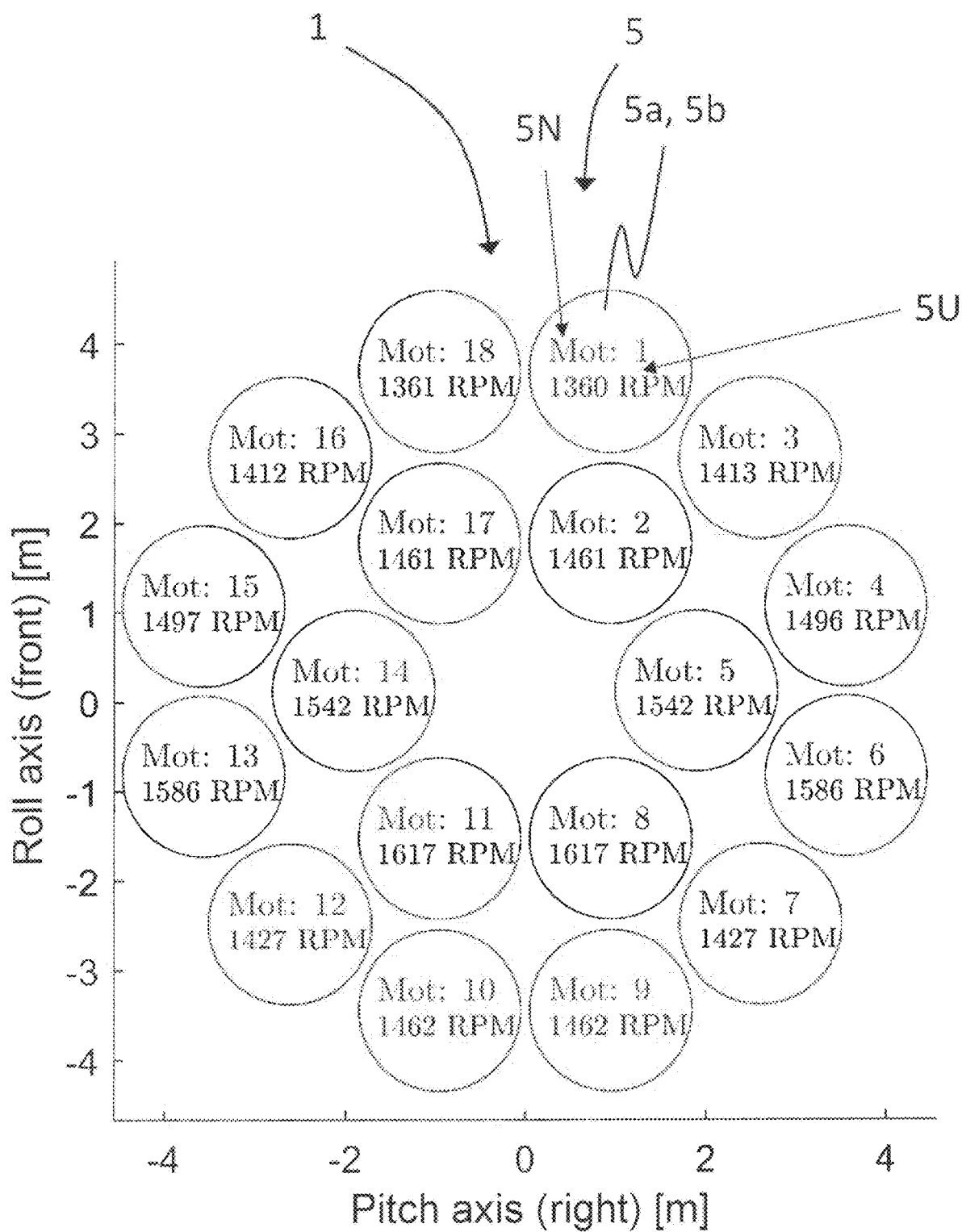
FIG. 4 shows a drive with reduced weighting of four motors.

A state is shown in FIG. 4 wherein the weighting for the motors "Mot:" 12, 10, 9 and 7 is reduced to 70% (g=0.7) in comparison with the remaining motors. The said motors are located at the bottom in the region of the periphery of the multicopter 1. This too can contribute to a protection of the said motors or of the associated energy stores. In addition or alternatively, a mechanical deformation of the multicopter 1 can be countered in this way, e.g. in the case of unequal load distribution.

FIGS. 5 and 6 finally show schematically the structure of a flight control unit according to the invention which is respectively identified with reference sign 4 (cf. FIG. 1). According to FIGS. 5 and 6, the flight control unit 4 is shown separate from the aircraft (multicopter) itself, although of course it represents part of the same construction. Reference sign 5c identifies, as in FIG. 1, a (partial) system of the multicopter 1, monitored by sensors, which in the present example is again an electric energy store (battery or accumulator). Reference sign 5d identifies, as in FIG. 1, an associated sensor which is, for example, designed for the measurement of a temperature ("Temp.") or a charge state ("State of Charge" (SoC)) of the electric energy store 5c. As in FIG. 1, reference sign S5d identifies the sensor signal provided by sensor 5b. As in FIG. 1, reference sign S4 identifies the flight control signal (drive signal) transmitted from the flight control unit 4 to the multicopter 1 or its motors (not shown in FIGS. 5 and 6). Reference is additionally made in this connection to the illustration and description of FIG. 1.

According to FIGS. 5 and 6, the flight control unit 4 receives, in accordance with reference signs 2 and 3, a pilot command that defines a desired flight state as an input signal. This pilot command 2, 3 reaches a subsidiary unit of the flight control unit 4 which is identified in FIGS. 5 and 6 with reference sign 4a. It is labelled as "Flight control and regulation", and is finally definitive for the flight operation of the multicopter 1. From this it receives a flight control measurement signal ("Flight Control Measurement Signal"), through which a current flight state of the multicopter 1 is determined. With the knowledge of this measurement signal and of the pilot command 2, 3 the flight control and regulation unit 4a determines the associated torques and the thrust, and forwards these in the form of signal technology to a further subsidiary unit ("Control Allocation") identified with reference sign 4b. With reference to the mathematical relationship given in the introductory part, the subsidiary unit 4b calculates the motor commands or motor control variables, and forwards these in the form of the signal S4 to the multicopter 1 or to the motors (not illustrated in FIGS. 5 and 6). In other words, following drive by use of the signal S4, the multicopter 1 should reach a flight state that corresponds as closely as possible to the pilot command 2, 3.

In addition, at reference sign 4c, the flight control unit 4 also comprises what is known as a secondary control unit or a corresponding secondary controller which, according to FIG. 5, interacts directly with the subsidiary unit 4b and, depending on the measurement signal 5d, makes the matrix P, or the weighting factors $g_i$ for the individual motors, available. These weighting factors are taken into account by the subsidiary unit 4b for the calculation or generation of the signal S4, as explained in detail further above. This relates to the case A) given in the claims.

FIG. 6 illustrates the case B) given in the claims. For this purpose, the secondary control 4c does not interact directly with the subsidiary unit 4b, but acts at a summation node 4d that follows the subsidiary unit 4b, directly modifying the signal S4 generated by the subsidiary unit 4b, as illustrated. Through the use of the zero space orientations $u_N$ discussed in the introductory part, the motor drive can be influenced in this way without the flight behavior of the multicopter 1 as a whole being changed. The zero space orientations do not generate any torques or any thrust, and therefore do not influence the flight movement. Such a procedure is in principle equivalent to the method described with reference to FIG. 5.

According to FIG. 5 for case A) and FIG. 6 for case B) the feedback of the control signal S5d measured or made available by the sensors 5d forms a closed control loop. Here P (case A) or $u_N$ (case B) represent the corresponding control variables of the respective secondary controller 4c.

The invention claimed is:

1. A method for stabilizing an orientation and height of a person-carrying or load-carrying multicopter having a plurality of motors, the method comprising:

continuously calculating a drive of individual ones of the motors in flight using a flight control unit and correspondingly prescribed to the motors using control technology, based on a desired torque τ, on a desired thrust s prescribed by a pilot signal, and on a motor matrix M, calculating the drive of the motors using a motor allocation algorithm f and providing a control signal to the motors, wherein for the drive and corresponding motor control variables u:

$u = f(\tau, s, M)$, and at least one of

A) weighting the individual motors with a secondary control matrix P, so that:

$u = f(\tau, s, M, P)$, the motor allocation algorithm calculates the drive u such that the individual motors each make an individual contribution to the desired torque τ and to the thrust s in accordance with the secondary control matrix P depending on the weighting such that no additional torques or thrusts are generated that have an effect on flight movement;

or

B) primary motor control variables in the form of the drive u of the motors are modified by secondary motor control variables $u_N$, which secondary motor control variables represent zero space orientations that satisfy the condition $0 = M \cdot u_N$ such that no additional torques or thrusts are generated that have an effect on flight movement.

2. The method as claimed in claim 1, wherein, for case A), the drive u is determined based on a model $$\begin{pmatrix} \tau \\ s \end{pmatrix} = M \cdot u$$

and wherein the weighting factors P are defined by a target function $u^T \cdot P \cdot u$ for the allocation, and the target function is minimized under an auxiliary condition $(\tau\ s)^T = M \cdot u$.

3. The method as claimed in claim 2, wherein for case A) in a neutral case the secondary control matrix P corresponds to an n×n identity matrix, where n represents the number of motors.

4. The method as claimed in claim 3, wherein in case A), the motors whose assigned electric energy stores at least one of heat up more strongly or discharge more quickly, are given a lower weighting by the secondary control matrix P than other ones of the motors.

5. The method as claimed in claim 4, wherein for case A) the motors that at least one of bring about an excessive deformation of a structure of the multicopter or lead to an excessive generation of noise are given a lower weighting by the secondary control matrix P than other ones of the motors.

6. The method as claimed in claim 1, wherein for case A) at least some of the motors (5a) are relieved through the drive of the motors by the secondary control matrix P, and a flight time is thereby extended with respect to operation with an unweighted drive, or a safety reserve increased.

7. The method as claimed in claim 4, wherein at least one of the following influencing values is used as the influencing value for calculation of weighting factors for the secondary control matrix P or the zero space orientations:

a measured temperature of at least one of the electric energy stores assigned to the motors;

a measured temperature of at least one of the motors;

a measured temperature of at least one of the electrical or mechanical accessory parts assigned to the motors;

a measured or estimated deformation of a structure of the multicopter; or a measured or estimated noise emission.

8. The method as claimed in claim 7, wherein for case A) at least one of the weighting factors is reduced if an influencing value used exceeds a predetermined threshold value.

9. The method as claimed in claim 7, wherein for case A) a reduction in the weighting of one of the motors brings about a reduction in a corresponding motor speed.

10. A flight control unit for a person-carrying or load-carrying multicopter including a plurality of motors, said flight control unit is configured to calculate continuously a drive of the individual motors in flight and correspondingly prescribe said drive to the motors using control technology, wherein the drive of the motors is calculated by a motor allocation algorithm f implemented in the flight control unit based on a desired torque τ, on a desired thrust s described by a pilot signal, and on a motor matrix M and is made available as a control signal to the motors, wherein the following applies for the motor control variables u:

$u = f(\tau, s, M)$, the flight control unit further comprising a secondary control unit in operative connection with the motor allocation algorithm and with at least one sensor for determination of an influencing variable, and at least one of A) configuring the secondary control to make weightings of the individual motors available to the motor allocation algorithm in the form of a filled secondary control matrix P depending on at least one influencing variable determined by the sensor, wherein the following applies:

$u = f(\tau, s, M, P)$, wherein the motor allocation algorithm is configured to calculate the drive u such that the individual motors make an individual contribution to the desired forces and torques τ and to the thrust s in accordance with the matrix P depending on the weighting such that no additional torques or thrusts are generated that have an effect on flight movement; or
B) configuring the secondary control, depending on at least one influencing variable determined by the sensor, also to provide signals for drive u of the motors are modified by secondary motor control variables $u_N$, which secondary motor control variables represent to zero space orientations with $$0 = M \cdot u_N$$

which do not generate any torques or thrust and therefore do not influence the flight movement, and to modify the drive through these zero space orientations.

11. The flight control unit as claimed in claim 10, further comprising at least one of:
a) at least one sensor configured for determining an operating state including a voltage of an energy store and signaling a corresponding control signal to the secondary controller, said secondary controller carrying out a balancing of a loading of the electric energy store;
b) at least one sensor configured for determining an operating state including a temperature of an energy store and signaling a corresponding control signal to the secondary controller, said secondary controller carrying out a balancing of the electrical energy store to prevent overheating of the electric energy store;
c) at least one sensor configured for determining an operating state including a deformation of a structure of the multicopter and signaling a corresponding control signal to the secondary controller, said secondary controller carrying out a load adjustment of the individual motors to attenuate aeroelasticity; or
d) at least one sensor configured for determining an operating state including noise emission of a propeller and signaling a corresponding control signal to the secondary controller, said secondary controller carrying out a load adjustment of the individual motors to attenuate noise.

12. The flight control unit as claimed in claim 11, wherein the flight control unit is configured such that, in accordance with the control signal by way of the secondary controller, the drive of the motors is influenced so that the operating state approaches a predefined operating state.

13. The flight control unit as claimed in claim 12, wherein the flight control unit is configured to determine the drive, based on a model $$\begin{pmatrix} \tau \\ s \end{pmatrix} = M \cdot u$$

wherein the weighting factors P are defined by a target function $u^T \cdot P \cdot u$ for the allocation, for which the target function is minimized under an auxiliary condition $(\tau\ s)^T = M \cdot u$.

14. The flight control unit as claimed in claim 13, wherein for case A), by use of the secondary control matrix P the motors whose associated electric energy store at least one of heats up more strongly or discharges more quickly as a result of load distributions in the multicopter are given a lower weighting than other ones of the motors, or for case A) by use of the secondary control matrix P the motors that at least one of bring about an excessive deformation of a structure of the multicopter or which lead to an excessive generation of noise are given lower weighting than other ones of the motors.

15. A multicopter comprising a plurality of motors, and a flight control unit for driving the motors, the flight control unit is configured to calculate continuously a drive of the individual motors in flight and correspondingly prescribe said drive to the motors using control technology, wherein the drive of the motors is calculated by a motor allocation algorithm f implemented in the flight control unit on based on a desired torque τ, on a desired thrust s described by a pilot signal, and on a motor matrix M and is made available as a control signal to the motors, wherein the following applies for the corresponding motor control variables u:

$$u = f((\tau, s, M),$$

the flight control unit further comprising
a secondary control unit in operative connection with the motor allocation algorithm and with at least one sensor for determination of an influencing variable, and at least one of
A) configuring the secondary control to make weightings of the individual motors available to the motor allocation algorithm in the form of a filled secondary control matrix P depending on at least one influencing variable determined by the sensor, wherein the following applies:

$$u = f((\tau, s, M, P),$$

wherein the motor allocation algorithm is configured to calculate the drive u such that the individual motors make an individual contribution to the desired forces and torques τ and to the thrust s in accordance with the matrix P depending on the weighting such that no additional torques or thrusts are generated that have an effect on flight movement; or
B) configuring the secondary control, depending on at least one influencing variable determined by the sensor, also to provide signals for drive of the motors corresponding to zero space orientations, with secondary motor control variables $u_N$ that modify the primary-motor control variables in the form of the drive u, where $$0 = M \cdot u_N$$

which do not generate any torques or thrust and therefore do not influence the flight movement, and to modify the drive through these zero space orientations.

16. A method for stabilizing an orientation and height of a person-carrying or load-carrying multicopter having a plurality of motors, the method comprising:
continuously calculating a drive of individual ones of the motors in flight using a flight control unit and correspondingly prescribed to the motors using control technology, based on a desired torque τ, on a desired thrust s prescribed by a pilot signal, and on a motor matrix M, calculating the drive of the motors using a motor allocation algorithm f and providing a control signal to the motors, wherein for the drive and corresponding motor control variables u:

$$u = f((\tau, s, M),$$

A) weighting the individual motors with a secondary control matrix P, so that:

$$u = f((\tau, s, M, P),$$

the motor allocation algorithm calculates the drive u such that the individual motors each make an individual contribution to the desired torque τ and to the thrust s in accordance with the secondary control matrix P depending on the weighting such that no additional torques or thrusts are generated that have an effect on flight movement; and B) modifying primary motor control variables in the form of the drive u of the motors by secondary motor control variables $u_N$, which secondary motor control variables represent zero space orientations that satisfy the condition $0 = M \cdot u_N.$

* * * * *